US008041739B2

(12) United States Patent  
Glasgow (10) Patent No.: US 8,041,739 B2
(45) Date of Patent: Oct. 18, 2011

(54) AUTOMATED SYSTEM AND METHOD FOR PATENT DRAFTING AND TECHNOLOGY ASSESSMENT

(76) Inventor: JiNan Glasgow, Raleigh, NC (US)

( * ) Notice: Subject to any disclaimer, the term of this patent is extended or adjusted under 35 U.S.C. 154(b) by 1314 days.

(21) Appl. No.: 09/943,799

(22) Filed: Aug. 31, 2001

(65) Prior Publication Data

US 2003/0065637 A1  Apr. 3, 2003

(51) Int. Cl.
G06F 7/00 (2006.01)
(52) U.S. Cl. ........ 707/791; 707/797; 707/804; 707/805; 715/708; 715/713; 715/762
(58) Field of Classification Search .................. 707/3, 6, 707/7, 100–104.1, 10, 1–2, 791, 796, 797, 707/798, 800, 804, 805; 715/507, 526, 500, 715/530, 234, 236, 270, 200, 209, 277, 712, 715/713, 775, 514, 515, 708, 762; 705/1, 705/10, 26, 59; 704/9
See application file for complete search history.

(56) References Cited

U.S. PATENT DOCUMENTS

| 5,181,162 | A | * | 1/1993 | Smith et al. ................... 715/530 |
| 5,692,206 | A | * | 11/1997 | Shirley et al. ................. 715/531 |
| 5,706,452 | A | * | 1/1998 | Ivanov .......................... 715/751 |
| 5,745,745 | A | * | 4/1998 | Tada et al. ......................... 707/1 |
| 5,754,840 | A |   | 5/1998 | Rivette et al. |
| 5,774,833 | A | * | 6/1998 | Newman ............................ 704/9 |
| 5,798,752 | A | * | 8/1998 | Buxton et al. ................. 715/863 |
| 5,892,513 | A | * | 4/1999 | Fay ................................ 715/854 |
| 5,950,214 | A | * | 9/1999 | Rivette et al. ................. 715/512 |
| 5,956,726 | A | * | 9/1999 | Aoyama et al. ............... 707/102 |
| 5,963,208 | A | * | 10/1999 | Dolan et al. ................... 715/854 |
| 5,991,709 | A | * | 11/1999 | Schoen ........................ 707/104.1 |
| 5,991,751 | A |   | 11/1999 | Rivette et al. |
| 6,049,811 | A | * | 4/2000 | Petruzzi et al. ............... 715/507 |
| 6,055,544 | A | * | 4/2000 | DeRose et al. ............. 707/104.1 |
| 6,105,044 | A | * | 8/2000 | DeRose et al. ................ 715/514 |
| 6,266,684 | B1 | * | 7/2001 | Kraus et al. ................... 715/209 |
| 6,298,327 | B1 | * | 10/2001 | Hunter et al. ..................... 705/1 |
| 6,298,407 | B1 | * | 10/2001 | Davis et al. ................... 710/314 |
| 6,327,586 | B1 | * | 12/2001 | Kisiel .............................. 707/2 |

(Continued)

OTHER PUBLICATIONS

Carpendale et al.—"A Framework for Unifying presentation Space"—UIST'01 Proceedings of the 14th annual ACM symposium on User Interface Software and Technology 2001 ACM (pp. 61-70).*

(Continued)

*Primary Examiner* — John E Breene
*Assistant Examiner* — Anh Ly
(74) *Attorney, Agent, or Firm* — Triangle Patents (57) ABSTRACT

A system and method for patent application drafting, issued patent assessment and technology assessment includes a computer having input devices for at least one user to enter information relating to components of an invention in a hierarchical and relational categorization using software that automatically generates a relational, diagrammatic representation of the patent or technology being assessed that is output in a format that is viewable and modifiable by the user(s). The user(s) may enter additional, more detailed information that provides a basis for textual representation of the patent or technology that is being drafted or assessed; this additional information is associated with and/or connected to the diagrammatic representation, e.g., via an automatic link or a hyperlink, that permits the user(s) to switch between views of the diagram and the text-based detailed description of components of the patent.

16 Claims, 2 Drawing Sheets

U.S. PATENT DOCUMENTS

| | | | | |
|---|---|---|---|---|
| 6,339,767 | B1* | 1/2002 | Rivette et al. | 707/781 |
| 6,341,280 | B1* | 1/2002 | Glass et al. | 707/754 |
| 6,385,619 | B1* | 5/2002 | Eichstaedt et al. | 707/748 |
| 6,434,580 | B1* | 8/2002 | Takano et al. | 715/530 |
| 6,477,528 | B1* | 11/2002 | Takayama | 707/5 |
| 6,493,717 | B1* | 12/2002 | Junkin | 707/754 |
| 6,496,803 | B1* | 12/2002 | Seet et al. | 705/14 |
| 6,526,410 | B1* | 2/2003 | Aoyama et al. | 707/102 |
| 6,535,883 | B1* | 3/2003 | Lee et al. | 707/694 |
| 6,546,406 | B1* | 4/2003 | DeRose et al. | 715/513 |
| 6,565,861 | B1* | 5/2003 | Tiffany et al. | 715/270 |
| 6,574,645 | B2* | 6/2003 | Petruzzi et al. | 715/530 |
| 6,603,487 | B1* | 8/2003 | Bennett et al. | 715/751 |
| 6,604,114 | B1* | 8/2003 | Toong et al. | 707/104.1 |
| 6,654,767 | B2* | 11/2003 | McAnaney et al. | 707/104.1 |
| 6,665,656 | B1* | 12/2003 | Carter | 707/748 |
| 6,701,301 | B2* | 3/2004 | Seet et al. | 705/14 |
| 6,741,998 | B2* | 5/2004 | Ruth et al. | 707/797 |
| 7,028,043 | B2* | 4/2006 | Bleizeffer et al. | 707/754 |
| 7,058,884 | B2* | 6/2006 | Kelsey | 715/239 |
| 7,076,496 | B1* | 7/2006 | Ruizandrade | 707/695 |
| 7,089,239 | B1* | 8/2006 | Baer et al. | 707/6 |
| 7,197,517 | B2* | 3/2007 | Farrington et al. | 707/101 |
| 7,287,214 | B1* | 10/2007 | Jenkins et al. | 715/205 |
| 7,644,360 | B2* | 1/2010 | Beretich et al. | 715/270 |
| 7,724,249 | B1* | 5/2010 | Horikawa et al. | 715/734 |
| 2001/0034739 | A1* | 10/2001 | Anecki et al. | 707/500 |
| 2001/0049707 | A1* | 12/2001 | Tran | 707/530 |
| 2001/0054048 | A1* | 12/2001 | Kelsey | 707/513 |
| 2002/0035571 | A1* | 3/2002 | Coult | 707/104.1 |
| 2002/0040338 | A1* | 4/2002 | Sick et al. | 705/37 |
| 2002/0073165 | A1* | 6/2002 | McNulty et al. | 709/217 |
| 2002/0078082 | A1* | 6/2002 | Petruzzi et al. | 707/500 |
| 2002/0082890 | A1* | 6/2002 | Bracchitta et al. | 705/8 |
| 2002/0087442 | A1* | 7/2002 | Reader | 705/31 |
| 2002/0087562 | A1* | 7/2002 | McAnaney et al. | 707/100 |
| 2002/0095368 | A1* | 7/2002 | Tran | 705/37 |
| 2002/0112114 | A1* | 8/2002 | Blair et al. | 711/100 |
| 2002/0116363 | A1* | 8/2002 | Grainger | 707/1 |
| 2002/0116420 | A1* | 8/2002 | Allam et al. | 707/512 |
| 2002/0120633 | A1* | 8/2002 | Stead | 707/104.1 |
| 2002/0138297 | A1* | 9/2002 | Lee | 705/1 |
| 2002/0138473 | A1* | 9/2002 | Whewell et al. | 707/3 |
| 2002/0161733 | A1* | 10/2002 | Grainger | 705/1 |
| 2003/0033295 | A1* | 2/2003 | Adler et al. | 707/3 |
| 2003/0046307 | A1* | 3/2003 | Rivette et al. | 707/104.1 |
| 2003/0061101 | A1* | 3/2003 | Seet et al. | 705/14 |
| 2004/0015481 | A1* | 1/2004 | Zinda | 707/1 |
| 2004/0088332 | A1* | 5/2004 | Lee et al. | 707/200 |
| 2004/0138952 | A1* | 7/2004 | Seet et al. | 705/14 |
| 2004/0158587 | A1* | 8/2004 | Shay et al. | 707/201 |
| 2004/0167895 | A1* | 8/2004 | Carro | 707/9 |
| 2004/0168129 | A1* | 8/2004 | Roebuck | 715/530 |
| 2004/0181427 | A1* | 9/2004 | Stobbs et al. | 705/1 |
| 2004/0205598 | A1* | 10/2004 | Takahashi et al. | 715/513 |
| 2004/0205599 | A1* | 10/2004 | Whewell et al. | 715/515 |
| 2004/0260569 | A1* | 12/2004 | Bell et al. | 705/1 |
| 2005/0108652 | A1* | 5/2005 | Beretich et al. | 715/764 |
| 2005/0144177 | A1* | 6/2005 | Hodes | 707/100 |
| 2005/0165736 | A1* | 7/2005 | Oosta | 707/2 |
| 2005/0177574 | A1* | 8/2005 | Riley et al. | 707/10 |
| 2006/0010377 | A1* | 1/2006 | Anecki et al. | 715/530 |
| 2006/0161549 | A1* | 7/2006 | Bartkowiak et al. | 707/9 |
| 2006/0173920 | A1* | 8/2006 | Adler et al. | 707/104.1 |
| 2006/0190805 | A1* | 8/2006 | Lin | 715/500 |
| 2006/0190807 | A1* | 8/2006 | Tran | 715/530 |
| 2006/0224412 | A1* | 10/2006 | Frank et al. | 705/1 |
| 2006/0294180 | A1* | 12/2006 | Lovisa | 709/203 |
| 2007/0208669 | A1* | 9/2007 | Rivette et al. | 705/59 |
| 2007/0299853 | A1* | 12/2007 | Knotz et al. | 707/10 |
| 2008/0154767 | A1* | 6/2008 | D'Agostino | 705/38 |
| 2008/0281860 | A1* | 11/2008 | Elias et al. | 707/102 |
| 2009/0205026 | A1* | 8/2009 | Haff et al. | 726/5 |

OTHER PUBLICATIONS

Ostrand et al.—"A Visual test Development Environment for GUI Systems"—ISSTA-98 Proceedings of the 1998 ACM SIGSOFT International Symposium on software and analysis—ACM SIGSOFT software engineering Notes, vol. 23, issue 2, Mar. 1998 (pp. 82-92).*

Stern, R. H.—"The PTO on software patents"—Micro, IEEE, Aug. 1995, vol. 15, issue 4 (pp. 1-4).*

* cited by examiner

AUTOMATED SYSTEM AND METHOD FOR PATENT DRAFTING AND TECHNOLOGY ASSESSMENT

BACKGROUND OF THE INVENTION (1) Field of the Invention

The present invention relates generally to patent application drafting and technology assessment and, more particularly, to an automated system and method for patent application drafting, issued patent assessment, and technology assessment.

(2) Description of the Prior Art

Typically, patent applications and assessments of issued patents have been done manually, i.e., an inventor or patent practitioner independently outlines and drafts specification text and drawings to provide an adequate description and disclosure of an invention, including claims to subject matter that is patentably distinct from prior art references in such a manner as to meet the requirements for obtaining letters patent by the appropriate governmental authority or agency. Generally, each patent drafter constructs the text-based description and claims based upon an individual frame of reference, which is based upon experience, technical understanding of the invention, legal requirements, and personal writing style. Because these factors are substantially influenced by subjective perspective, for any given invention, variation as to patent drafting technique and substance of the text is common among inventors and patent practitioners. Thus, consistency of practice among patent drafters is not well established. Additionally, training new practitioners also lacks consistency, based upon the variation of drafting techniques that are taught by experienced practitioners. Therefore, a systematic approach to patent drafting is needed to provide a consistent and reliable means for drafting patent applications and training others to do the same among existing patent drafters, particularly among professional practitioners.

Prior art patent drafting aids may employ computers, as set forth in U.S. Pat. No. 6,049,811 issued Apr. 11, 2000 to Petruzzi, et al., in order to provide a means for storing information related to an invention, including common subcomponents of a patent application, namely features and benefits of the invention that define the invention over prior art, primary elements of the invention that define the invention over prior art, secondary elements that are important but that do not necessarily define the invention over prior art, and substitute elements of the invention. These subcomponents are stored by a computer, with the descriptive text relating to each of them being provided by the patent drafter. A final patent application is compiled by combining these drafted sections with predetermined text. However, this computer-based type of prior art merely serves to prompt the user for information to be entered into a patent application and automatically draft a patent application therefrom, without providing any sort of outline or preview of the patent application substance so that editing may be done in an early stage of patent drafting, saving time and avoiding inconsistencies within the patent that is eventually drafted. Furthermore, there is little flexibility of form or format within the patent application being generated with computer assistance; the user does not have an opportunity to define relationships between and among subcomponents that may have a significant effect upon patentability as well as the user's understanding of the invention that is claimed for the purposes of enforcement or explaining it to others.

Thus, there remains a need for a systematic approach to patent drafting having a consistent and reliable means, preferably automated or assisted by automation, for drafting patent applications and training others to do the same among existing patent drafters, particularly among professional practitioners, in order to ensure patent quality and to provide a common language or means for communicating the substance and form of a patent application and/or issued patent and/or technology that is being assessed.

Also, there remains a need for an automated version of the system and method for patent application drafting, issued patent assessment, and technology assessment that provides increased efficiency via reduced time for formatting and substantive text and diagrammatic representation construction of the same. Furthermore, there remains a need for an automated system and method for patent application drafting, issued patent assessment, and technology assessment that provides an outline or preview of the patent application substance so that editing may be done in an early stage of patent drafting, saving time and avoiding inconsistencies within the patent that is eventually drafted.

Also, there remains a need for such a system and/or method having flexibility of form or format within the patent application being generated with computer assistance such that the user(s) has an opportunity to define relationships between and among subcomponents that may have a significant effect upon patentability as well as the user's understanding of the invention that is claimed for the purposes of enforcement or explaining it to others. Additionally, there remains a need for such a system and/or method that permits a multiplicity of users to work on the same patent or technology simultaneously or in series, which is permitted only by a common understanding of the format, the substance, and the language or terminology selected by the user(s) to define the invention, patent, and/or technology such that little or no additional communication is required among co-users or collaborators in order to function efficiently and effectively together.

SUMMARY OF THE INVENTION

It is an object of the present invention to provide an automated system and method for patent drafting, issued patent assessment, and/or technology assessment that provides increased efficiency via reduced time for formatting and substantive text and diagrammatic representation construction of the same.

It is another object of the present invention to provide a system and method for patent drafting, issued patent assessment, and/or technology assessment having a consistent and reliable format and process to ensure patent quality and to provide a common language or means for communicating the substance and form of a patent application and/or issued patent and/or technology that is being assessed.

Still another object of the present invention is to provide an automated system and method for patent application drafting, issued patent assessment, and technology assessment that provides an outline or preview of the patent application substance so that editing may be done in an early stage of patent drafting, saving time and avoiding inconsistencies within the patent that is eventually drafted.

Also, another object of the present invention is to provide an automated system and method for patent application drafting, issued patent assessment, and technology assessment that providing flexibility of form or format within the patent application being generated with computer assistance such that the user(s) has an opportunity to define relationships between and among subcomponents that may have a significant effect upon patentability as well as the user's understanding of the invention that is claimed for the purposes of enforcement or explaining it to others.

In a preferred embodiment of the present invention, a system for patent application drafting, issued patent assessment, and technology assessment includes a computer having input devices for at least one user to enter information relating to components of an invention in a hierarchical and relational categorization using software that automatically generates a relational, diagrammatic representation of the patent or technology being assessed that is output in a format that is viewable and modifiable by the user(s). Subsequently, the user(s) may enter additional, more detailed information that provides a basis for textual representation of the patent or technology that is being drafted or assessed; this additional information is associated with and/or connected to the diagrammatic representation, e.g., via an automatic link or a hyperlink, that permits the user(s) to switch between views of the diagram and the text-based detailed description of components of the patent. Subsequently, the components of the patent being drafted are formatted into a text-based arrangement that is suitable for filing as a patent application, with additional modifications, transitions, and/or standard language capable of being introduced prior to printing or electronic conveyance of the patent application for filing.

Similarly, in a preferred embodiment of the present invention, a method for using the aforementioned system is provided, including the steps of at least one user inputting information to a computer or other automated electronic device, the information being ordered in a hierarchical and relational categorization, the computer or device using software to automatically generate a relational, diagrammatic representation of the patent or technology being assessed, outputting the information in a format that is viewable and modifiable by the user(s), automatically generating a text-based format of the information consistent with the relational, diagrammatic representation of the information that is consistent with a format that may be submitted for filing a patent, modifying the text-based format, as required, and outputting a printed or electronic version that may be conveyed to a third party for review and/or patent filing.

These and other aspects of the present invention will become apparent to those skilled in the art after a reading of the following description of the preferred embodiment when considered with the drawings, which constitute a part of the specification and include exemplary embodiments for the purpose of facilitating explanation of the present invention, which may be embodied in various forms.

DETAILED DESCRIPTION OF THE PREFERRED EMBODIMENTS

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto. In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Figure 1:
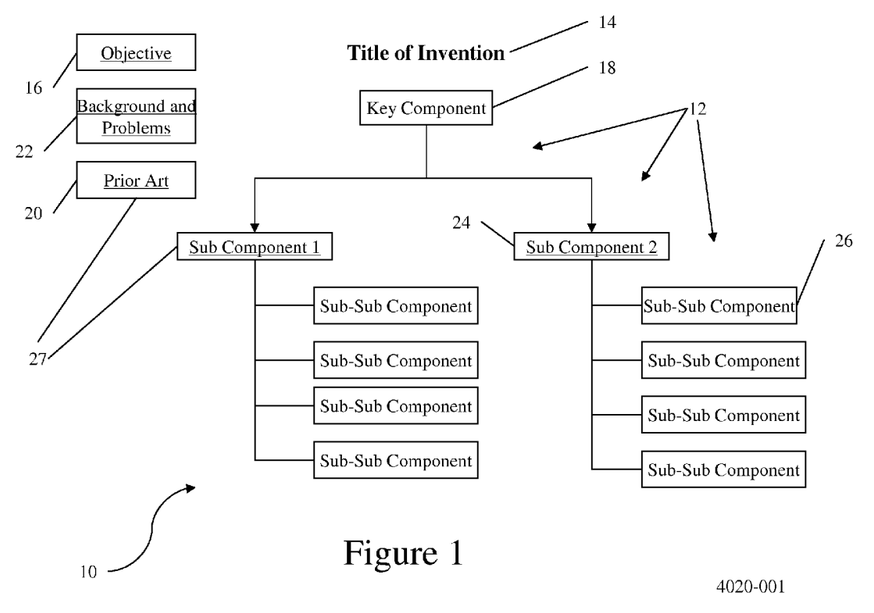
FIG. 1 is a block diagram of a patent diagram of the system constructed according to the present invention.
Figure 2:
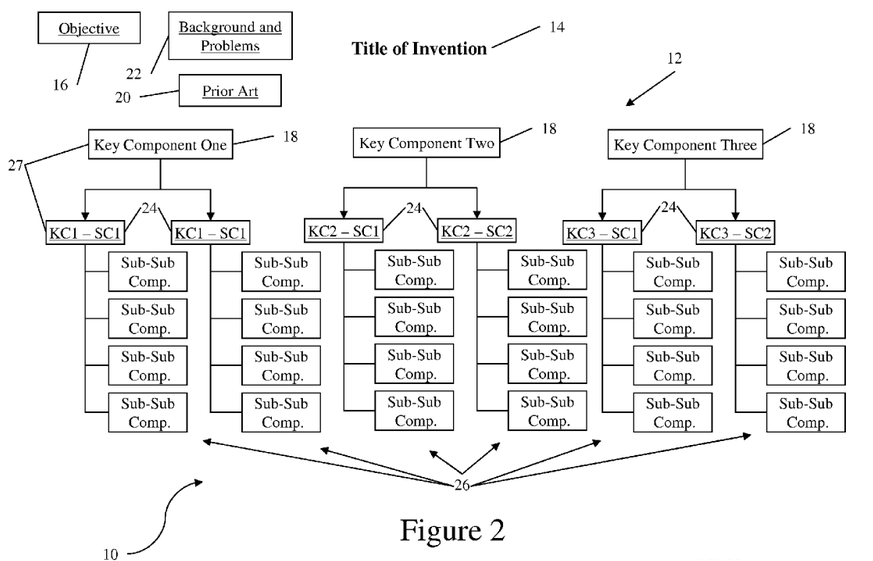
FIG. 2 is a block diagram of an alternative embodiment of the present invention.

Referring now to FIG. 1, a block diagram of a hierarchical component categorization according to the system of the present invention, generally referenced as 10, is shown. The block diagram, displayed in a single pane, includes a geometric outline 27 around each component or claim to more clearly distinguish them from one another. The method begins with the inputting of patent or technology elements or components, generally referenced as 12, into a data processor, such as a computer, by at least one user via an input device, e.g., computer keyboard, mouse, voice, etc. or combinations thereof. These components or elements are divided into key components or key elements, including the title 14, function or objective of the technology or invention 16, at least one key component 18, and overall benefit of the invention. The at least one key component 18 of the invention are those essential for functioning of the invention and those that are necessary for providing patentable distinction over the prior art 20, if any. Also, information relating to background and problems 22 may be input into the system as well. These initial or primary inputs are automatically configured into a hierarchical and relational diagrammatic format, which is generated by a software program and which is capable of being viewed by the at least one user on an output device, such as a computer screen, printed document or other tangible form. The at least one key component 18 may also have at least one subcomponent 24 that is relationally and hierarchically connected and configured automatically in the diagrammatic representation of the invention, patent, or technology in association with the at least one key component 18. Additionally, the at least one subcomponent 24 may also have at least one sub-subcomponent 26 that is relationally and hierarchically connected and configured automatically in the diagrammatic representation of the invention, patent, or technology in association with the at least one subcomponent and the related at least one key component 18. The diagrammatic representation of these components and sub-components includes a geometric outline 27 to more clearly distinguish them from one another. As best shown in FIG. 2, a multiplicity of key components, subcomponents and sub-subcomponents may be required for an adequate and complete description of the invention to be patented, patented invention, or technology being assessed. Each key component, related subcomponent, and related sub-subcomponents are input by the user(s) and automatically organized in a hierarchical and relational component categorization diagram that may be reconfigured later by the user(s) and updated automatically in the viewable output. The presentation of the diagram may be vertically oriented, horizontally oriented, or oriented in some other manner without departing from the organized hierarchical and relational categorization and configuration of the components considered within the scope of the present invention.

Other information may be advantageously included with the diagram 10, such as practitioner file number, client identifier, date, author, etc. in a predetermined location on the viewable output device or tangible representation or electronic format version of the diagram.

Furthermore, the at least one key components 18 do not necessarily need to be components of a specific embodiment as conventionally recognized in a patent application, but at least may be components generally required for the invention or technology to be functionally described in a concise and complete manner, as well as required for at least one broad claim of a patent application. In many cases, the at least one key component can be described functionally rather than by a specific embodiment, such as a data processor versus a personal computer. The at least one key component may then be further described or delimited by inputting subcomponents or other delimiters subsequent to the entry or input of the at least one key component into the system. These subcomponents may then also be further described or delimited by inputting their subcomponents. This process can be continued until the at least one key component is completely described. The description or delimiting process consists of naming the subcomponent and adding the specific function and/or benefit or particular commercial usefulness that the subcomponent provides.

The at least one key component can be multiple key components. These may then be organized according to importance, function, order of use in the invention, novelty, or according to any other prioritization system that the patent drafter desires to use.

The overall benefit or usefulness of the invention is also inputted as a key element of the invention. This benefit or usefulness may be limited to the improvement provided by the invention, or may be a more thorough description of the function of the invention along with the enhancement of the function provided by the invention.

The inputting of these elements need not follow the order described here. In fact, some drafters of technology descriptions and/or patent applications might prefer to proceed with another order of inputting, such as beginning with a subcomponent and further deconstructing the subcomponent according to its function until the drafter believes he/she has arrived at a key component that cannot be further deconstructed. Alternately, the drafter may prefer to deconstruct a subcomponent until he/she believes that further deconstruction will generate an embodiment that cannot be patented, such as an embodiment that is not novel, useful, or non-obvious.

Simultaneous or subsequent to the data inputting process, the system automatically organizes the inputted components and their subcomponents into a hierarchy based upon the user(s) inputs; the drafter may override or modify the initial hierarchical order or organization thereafter. This hierarchy is one in which the component and its subcomponent(s) are linked in a dependent manner or parent/child relationship. The components are thus linked such that they can be outputted in a format that preserves the hierarchy established by the drafter. The method also allows for the multiple hierarchy charts, such that multiple charts can be display alternately or simultaneously. This function can be important if a patent drafter is unsure of the hierarchy of components. Thus, optional hierarchies can be generated with which the drafter can query others as to which is the preferred hierarchy. The multiple charts can be made by duplicating the original chart and then varying only the elements to be changed.

The hierarchy may next be outputted in various formats and to various areas of a patent draft. In a preferred method according to the present invention, the hierarchy of elements is outputted in an outline format, a claims format, and a diagrammatic format.

The outline format is such that a patent specification can be written from the outputted outline. As shown in FIG. 2, the outline, generally described as "Title of Invention", is outputted in a format that is viewable by the user(s). Each component of the outline may then be described in further detail such that a complete and enabling description of the invention is made; advantageously, this additional detail is automatically connected, associated, or linked to one of the components shown within the diagram. More particularly, the text-based description providing additional detail for each key component, subcomponent, and sub-subcomponent may be viewed by the user(s) by selecting, e.g., pointing and clicking with a mouse or other selection device connected with a computer or electronic data organizer capable of running the software program associated with the system, the particular key component, subcomponent, and sub-subcomponent and being automatically connected to a viewable version of the text-based description associated therewith. Modifications to the text-based information input by the user(s) is modifiable at any stage of the method of using the system, once the information has been initially inputted. This text-based description may then be used as the specification of the invention for a patent application or may be used simply to describe an invention for purposes of disclosure or publication; it is automatically assembled into a text-based version of the description of the invention that integrates each key component, subcomponent, and sub-subcomponent in a related, logical, and appropriate order such that the final description is capable of being submitted as a patent application. Additional modifications may be made to the text-based description, once integrated into a single text-based document in order to provide appropriate and/or necessary transition, linkage, coherency, and/or standard text or language required for patent applications by a particular governmental agency or authority.

When the document is completed, the outline may also be outputted for use as a table of contents for the document, including hyperlinking the items in the table of contents to the appropriate sections of the document. Thus, complex technologies can be outlined and described and a table of contents generated with relative ease. Hyperlinking of the table of contents and the sections of the document allows for rapid perusal of the document.

Additionally, the information that is inputted by the user(s) is also automatically generated into a claims format that is included in the patent application text-based document set forth in the foregoing. This automatically generated claims format is one that preserves the parent/child or hierarchical relationship of the components established in the diagram. This parent/child or hierarchical relationship may be described by using an outline format or simply by the physical relationship between the claims, such as by listing a child component under its parent component and indenting the child component from the margin more than its parent component. Additionally, the claims format that is generated automatically by the software may include a detail of the component, such as a description of the additional function and/or specific benefit conferred by the component to the invention. In any case, the claims format that is automatically generated from the diagram and incorporated into the text-based description document is designed to comport with government requirements for patent applications. The claims are output into a viewable output, as with the diagram and text-based description, such that the user(s) may view, modify, and review them.

Advantageously, the claims output is consistent across technology applications. Thus, regardless of the type of technology that is the subject of the invention, and regardless of the experience of the user(s) or practitioner using the system and method according to the present invention, the claims are automatically generated in a format that conforms to the requirements of a specific patent or intellectual property organization, such as the United States Patent and Trademark Office or with World Intellectual Property Organization. Standard formatting, such as preambles, may also be generated from the inputs and are selectable and modifiable by the user(s) at any point after the initial inputting of the information. Also, standard format claims language may be inserted prior to the description of a component. For example, in where a second claim states "The method according to claim 1, wherein the inputted technology elements are selected from the group consisting of Title, ≧1 key component, function, overall benefit, and combinations thereof." In this claim, the phrase "The method according to claim" and "wherein the" are standard format claims language that is repeated in each of the dependent claims. Therefore, the method may automatically include these and other phrases in the claims. Because different formats exist for standard format claims language, phrase may be entered or selected prior to generating the claims. Additionally, the claims may be outputted such that they are numbered and they contain in them the number of their parent claim where appropriate.

Additionally, the output may be formatted such that multiple dependent claims are allowed or not allowed, according to the preference of the drafter, patent office, or other authority. Likewise, multiple-multiple dependent claims may be used, if desired or required.

Finally, the technology matrix diagram, along with the text-based information, associations therewith, including links and hyperlinks, and integrated text-based document, may be outputted in a tangible format, either on a computer screen or other electronic data processor or device's viewable output, printed by a peripheral printing device connected thereto, transmitted electronically to another device or third party, or saved in an electronic format, including on the device or on a portable electronic data storage device, e.g., palm-based organizer or PDA, diskette, CD-rom disk, and the like. This diagram is a visual representation of the technological hierarchy of the technology or invention. This diagram may be the same diagram used to generate the technological hierarchy or it may be a different diagram. For example, the hierarchy may be outputted in a 2-dimensional format such as a triangular format, a circular format, or an outline format, or a 3-dimensional format, such as a spherical, conical, or pyramidal format.

Frequently, a description of a technology involves many elements, and a diagrammatic representation of these elements may not fit in a legible manner entirely on standard A4 or letter paper or on a presentation screen, or slide. In such cases, sections of the diagram can be identified for exporting to a separate sheet, slide screen, or other the like. In the cases of patents with multiple independent claims, it may be most appropriate to represent each of the independent claims separately.

Finally, the components of the diagram may be linked to the section of the specification that describes them. This linking allows a person to get an overall view of technology, then read in more detail about a particular component of interest by "jumping" to the linked section of the specification.

Also, jumping back and forth between specification, claims, and diagram, because often the document drafter may think of another component or better ordering of components after having started writing the specification. This allows for incorporation of added elements into claims, such that they are not missed. Also, copy and pasting of a specification element into the technology hierarchical matrix will generate a hyperlink between diagram and spec and also between spec and table of contents when matrix is exported to table of contents.

The software of the present invention is designed and configured to provide a graphical interface for diagramming the structure of intellectual property in a patent application or for assessment of technology or issued patents and for automatically creating text-based description linked to components in the diagram and integrating those descriptions into a coherent specification and claims of a patent application. The software also exports the diagram and text-based description into other software programs that support diagrams and text, such as Microsoft Word software and the like.

Also in a preferred embodiment of the present invention, a method for using the aforementioned system is provided, including the steps of at least one user inputting information to a computer or other automated electronic device, the information being ordered in a hierarchical and relational categorization, the computer or device using software to automatically generate a relational, diagrammatic representation of the patent or technology being assessed, outputting the information in a format that is viewable and modifiable by the user(s), automatically generating a text-based format of the information consistent with the relational, diagrammatic representation of the information that is consistent with a format that may be submitted for filing a patent, modifying the text-based format, as required, and outputting a printed or electronic version that may be conveyed to a third party for review and/or patent filing.

At least the following primary steps of the method according to the present invention are necessary:
  at least one user entering information for diagram elements
  the system automatically generating a visual diagram of the elements of the invention in a hierarchical relational diagram
  at least one user entering diagram verbiage by drafting the text-based detailed description or verbiage of the specification section of the application for each key component, subcomponent, and sub-subcomponent of the diagram
  viewing the diagram and text-based information in a tangible medium, including but not limited to a viewer screen on an electronic data processor or computer, a printed document, and the like.

In addition to the primary steps by the user(s) the user(s) may also input additional key components, subcomponents, and/or sub-subcomponents. Furthermore, the user(s) may manipulate or move any previously inputted key components, subcomponents, and/or sub-subcomponents by shifting up and shifting down from the diagram, either via menu or directly on the diagram moving elements up and down in order among similarly ranked sibling elements. Shifting up and down conserves all sub-elements of the moved element and automatically updates the diagram as well as any related text-based description associated with each component. Dragging an element and dropping it on top of another element will move the dragged to element and make it a sub-element of the element it is dropped on. An element cannot be moved to one of its own child elements. Dragging and dropping conserves all sub-elements of the moved element.

Entering additional specification and/or claims text or verbiage may be done directly in the text-based portion of the document by the user(s) at any time after the initial text-based portion has been inputted by the user(s). The automatic claims construction includes the creation of prefixes or preambles or other introductory language, suffixes or termination language, transition or connective language relating parts within the claim or between/among claims, all of which are editable by the user(s); also, custom claim text or verbiage may be input when prompted automatically or later during editing by the user(s).

As can be seen, several benefits are associated with drafting a patent in a manner consistent with a preferred embodiment according to the present invention. Most notably, rapid drafting of patents and thorough effective identification, description, and organization of the patent components is provided by the system and method according to the present invention. Furthermore, editing is facilitated at any stage of the process of drafting a patent application or technology assessment; advantageously, the editing of the diagram at an early stage in the process is possible, thus reducing or eliminating time-consuming reorganization and editing at later stages in the process. Also, editing is facilitated in that from the diagram an editor can determine where in the specification to edit a specific claim or text-based portion of the specification and be automatically transferred to that portion of the text-based document, simply by accessing it via the appropriate key component, subcomponent, and/or sub-subcomponent within the diagram, as well as editing the diagram, which automatically edits the relationship within the text-based portion of the integrated document, including location within the specification description and claims.

Also advantageously, the system and method of the present invention as set forth in the foregoing provide ease of refreshing the at least one user's memory of the patent or technology, for example when revisiting claims during the prosecution phase of a patent application, or when consideration of possible infringement or enforcement of the patent is required; this saves time and also permits a multiplicity of users to access this information with similar ease, since the format, language, and use of the system provides for consistency among users and across technologies. Furthermore, the diagrammatic representation of the components in a hierarchical and relational manner provides a useful tool that facilitates the description and explanation of the scope and substance of patent claims and intellectual property covered by patent to interested third parties, including inventors (where a practitioner drafted the application on his/her behalf), management and decision-makers within a company who require quick summaries of patents and technology for business decision-making, stakeholders and investors in the patent and/or technology, enforcers of the patent, and the like.

Since many patents and technologies being drafted and/or assessed are complex but need to be considered by a variety of individuals having various levels of technology and legal understanding, the diagrammatic representation of the patent and/or technology provided by the present invention is easier to comprehend in a shorter period of time without having to review text-based descriptions of the same.

Example

As set forth in the foregoing, the software of the present invention is designed and configured to provide a graphical interface for diagramming the structure of intellectual property in a patent application or for assessment of technology or issued patents and for automatically creating text-based description linked to components in the diagram and integrating those descriptions into a coherent specification and claims of a patent application. The software also exports the diagram and text-based description into other software programs that support diagrams and text, such as Microsoft Word software and the like.

Prototype Program

The software of the system according to the present invention is designed and established to aid in diagramming intellectual property, displaying and manipulating the diagram in a way helpful to the patent drafters and clients, and converting the diagram into an actual patent application. The beta version set forth in this example was programmed in C++ using MFC and the Microsoft Visual C++ Standard Edition programming environment; other languages, e.g., Java, may alternatively be employed without departing from the scope of the present invention. The software of this example is capable of running on Microsoft Windows 2000, ME, NT 4.0, and 98; it requires under 10 MB hard disk space and under 8 MB of free RAM and is implemented as desktop application software. The software was developed using Microsoft Visual C++ and MFC, which permits it to interact well with the Windows operating system and Microsoft Office applications.

The following description of a software program developed as a prototype version of the software according to the system of the present invention is set forth by way of example and not of limitation. A prototype program was developed and implemented as a Windows MFC application using Microsoft Visual C++ as the primary programming environment. Other programming languages and systems may be advantageously employed without departing from the scope of the present invention, as it is described and claimed herein. The prototype program, set forth for example and not limitation, supports, at a minimum:

- A MS Windows application that integrates with the Windows desktop environment
- Entry of the patent or technology matrix diagram in a text-based, non-graphical format
- Entry of the patent or technology matrix diagram in a graphical format
- Basic sorting, editing, and rearranging of MATRIX elements
- Basic print functions
- Basic file storage and retrieval to allow saving and opening of MATRIX documents
- Basic patent draft exporting
- A rough draft of a users manual Other features are optional but advantageous for the software of the system according to the present invention, including:

- Enhanced Graphical User Interface (GUI) with user-friendly buttons, menus, help screens, and toolbars
- Incorporation of logos and icons
- Automatic linking or hyperlinking between the diagram components and text-based detailed description of those components, including prior art summaries and patents provided in a connectable on-line database Other program features of the software may advantageously include:

- Enhanced and streamline GUI that provides a professional interface complete will with all standard features of modem Windows applications (cut and paste, multi-document support, multiple file export formats, etc.); note that LINUX or other operating system structures are contemplated within the scope of the present invention
- Help dialogs accessible within the program operation by user(s)
- Graphical "bubble diagram" views of the diagram and document, complete with ability to click and drag elements to new locations; from this view user(s) may intelligently move elements around to make diagram aesthetically pleasing without departing from the hierarchical and relational structure of the component diagram Enhanced sharing and editing features that permit multiple users, including practitioners, clients and law firms to concurrently develop or view the diagram and/or document Data Structure Each element of the diagram is implemented as an object of an element class within the prototype software example according to the present invention. The diagram itself takes the form of a data tree. A header object that contains specifications of the diagram, including job number, client name, and title information is provided. The header object also contains a pointer to the first key component of the diagram. For the purposes of diagramming, key components are not different from regular elements, unless so identified by the user(s). According to the hierarchical relationship of components, each parent element or key component contains a pointer to the first child element or subcomponent of that element and the next sister element of that element. Thus the data structure of a very simple diagram may be viewed, in one configuration, as follows in Chart 1:

Chart 1. Diagram data structure for Example

This linked tree structure enables elements to be easily moved, sorted, and graphically rendered with a minimum of processing delay and memory usage. The element class also contains information about whether or not an element is simply a component of its parent or represents a dependent claim, as well as other information to facilitate easy manipulation of the data.

Drafting a patent application or technology assessment document using the system and software according to the present invention consists of three primary steps by a user:

Setting up a new diagram is simply entering the client, invention and/or inventor names and assigning the diagram a docket number, where appropriate, particularly if a practitioner is drafting the application on behalf of a client/inventor.

Entering diagram elements involves entering information from which a visual diagram of the elements of the invention is automatically constructed in a hierarchical relational diagram Entering diagram verbiage involves drafting the text-based detailed description or verbiage of the specification section of the application for each key component, subcomponent, and sub-subcomponent of the diagram.

In addition to the primary steps by the user(s) the user(s) may also input additional key components, subcomponents, and/or sub-subcomponents. Furthermore, the user(s) may manipulate or move any previously inputted key components, subcomponents, and/or sub-subcomponents by shifting up and shifting down from the diagram, either via menu or directly on the diagram moving elements up and down in order among similarly ranked sibling elements. Shifting up and down conserves all sub-elements of the moved element and automatically updates the diagram as well as any related text-based description associated with each component. Dragging an element and dropping it on top of another element will move the dragged to element and make it a sub-element of the element it is dropped on. An element cannot be moved to one of its own child elements. Dragging and dropping conserves all sub-elements of the moved element.

Entering additional specification and/or claims text or verbiage may be done directly in the text-based portion of the document by the user(s) at any time after the initial text-based portion has been inputted by the user(s). The automatic claims construction includes the creation of prefixes or preambles or other introductory language, suffixes or termination language, transition or connective language relating parts within the claim or between/among claims, all of which are editable by the user(s); also, custom claim text or verbiage may be input when prompted automatically or later during editing by the user(s).

A draft patent application, including the diagram, specification, and claims, as well as any figures, hyperlinks, prior art, etc. can be exported to an HTML or XML or similar file.

Certain modifications and improvements will occur to those skilled in the art upon a reading of the foregoing description. By way of example, alternative representations of the hierarchical diagrammatic representation of components of a patent or technology are possible without departing from the scope of the present invention. The vertical and horizontal-based diagrams set forth hereinabove are simply one preferred embodiment set forth for facilitating the description of the present invention. Also, a multiplicity of users may be working on the same patent application at the same time, via a connection of computers or data processing devices that provides for intercommunication electronically between the devices used by different users;

integration of the work of the multiplicity of users is provided automatically by the system and method of the present invention. Also, application of the system and method according to the present invention may be employed for patent and/or technology mapping to graphically or diagrammatically identify and/or describe the scope and depth of a particular patent or patent portfolio, grouping of patents, competitive intellectual property and technology and/or technology distribution within any industry, market, or technology application. All modifications and improvements have been deleted herein for the sake of conciseness and readability but are properly within the scope of the following claims.

I claim:

1. A system for drafting a patent application and assessing technological information on at least one computer, the system comprising:

a. at least one input device connected to the at least one computer for receiving information inputs from at least one user, wherein the inputs include a text-based description of an invention;

b. at least one processing means for automatically generating a diagrammatic representation of the invention by automatically transforming the information inputs including the text-based description, wherein the diagrammatic representation includes a hierarchical component categorization of the technical components, including at least one key component and at least one subcomponent associated with the key component of the invention based upon the information inputted by the at least one user, wherein the diagrammatic representation comprises graphical component structure and textual component content associated with each component such that for each component, the graphical component structure includes the textual component content, and wherein the graphical claim structure comprises multiple geometric outlines, each outline operable to fully display the textual claim content of at least part of one claim, and at least one line directly connecting the outlines to each other according the hierarchy of the at least part of a patent claims series; and for automatically generating a document for filing as a patent application, including specification and claims, based upon the information inputted by the at least one user and additional text-based detailed information that is organized consistent with the diagram; wherein the hierarchical component categorization includes at least one key component and at least one subcomponent related thereto, wherein the hierarchical component categorization contains the full text of the textual component content; wherein the diagrammatic representation of the components and subcomponents together provides an indication of what may be claimed in a patent application, and wherein the text-based information and the diagram components are automatically directly linked by being visually integrated with one another within the graphical component structure;

c. at least one output device connected to the at least one computer for outputting the automatically generated diagrammatic representation of an invention wherein the graphical component structure and textual component content being integrally visually generated and linked in a single, interactive diagram in a single user interface pane.

2. The system according to claim 1, wherein the diagram is modifiable by the at least one user and the diagram hierarchical component categorization and related text-based detailed information is automatically updated based upon the user modifications.

3. The system according to claim 1, wherein the at least one key component includes a multiplicity of components.

4. The system according to claim 1, wherein the at least one subcomponent further includes at least one sub-subcomponent.

5. The system according to claim 1, wherein the relational connection between components establishes the claims structure of the patent application.

6. The system according to claim 5, wherein the link(s) are hyperlinks.

7. The system according to claim 1, wherein the document and diagram are capable of being output into another software program.

8. The system according to claim 1, wherein the document and diagram are exportable in HTML format.

9. The system according to claim 1, wherein the document and diagram are exportable in XML format.

10. A method for drafting a patent application comprising the steps of:
a. providing a system for receiving information inputs relating to an invention, wherein the system includes a computer having a processor, a memory, graphic user interface, and input mechanisms;
b. the system automatically transforming the inputs by automatically generating a visual diagram of the components of the invention in a multiplicity of hierarchical relational including at least one key component and at least one subcomponent associated with the at least one key component, wherein the hierarchical relation diagram are diagrammatic of an invention, wherein the diagrammatic include a hierarchical component categorization of the technical components of the invention based upon the user inputted information, wherein the diagrammatic representation comprises graphical component structure and textual component content wherein the textual component is positioned within the graphical component structure for each component associated with each component such that for each component, the graphical component structure includes the full text of the textual component content, wherein the textual component and the diagram components are automatically directly linked by being visually integrated with one another within the diagrammatic representation and wherein the graphical component structure and textual component content being integrally visually generated and linked, and automatically generating a document for filing as a patent application, including specification and claims, based upon the user inputted information and additional text-based detailed information that is organized consistent with the diagram; wherein the hierarchical component categorization includes at least one key component and at least one subcomponent related thereto; and
c. the at least one user viewing the hierarchical and text-based information in a tangible medium, wherein the diagrammatic representation of the components and subcomponents together provides an indication of what may be claimed in a patent application.

11. The method according to claim 10, further including the step of:
at least one user entering diagram verbage_by drafting the text-based detailed description or verbage_of the specification section of the application for each component of the diagram wherein the text-based description and the diagram verbage_are automatically directly linked by being visually integrated with one another where the text associated with each component is included only within the diagram section for that component.

12. The method according to claim 10, further including the step of:
at least one user inputting additional components selected from the group consisting of key components, subcomponents, and sub-subcomponents.

13. The method according to claim 10, further including the steps of:
modifying any previously inputted components within the diagram; and
the system automatically updating the diagram and relational information to those modified components.

14. The method according to claim 10, further including the step of automatically generating a patent application based upon the inputted information and the hierarchical diagram, including specification and claims.

15. A system for mapping technology using at least one computing device, comprising:
a. at least one input device connected to the at least one computing device for receiving information inputs from at least one user;
b. at least one processing means for automatically generating a diagrammatic representation of a technology, wherein the diagrammatic representation includes a hierarchical component categorization of the technical components of the technology including at least one key component and at least one subcomponent associated with the at least one key component based upon the information inputted by the at least one user, wherein the diagrammatic representation comprises a visually integrated and linked graphical component structure and textual component content associated with each component, and wherein the graphical claim structure comprises multiple geometric outlines, each outline operable to fully display the textual content of a component or subcomponent, and at least one line directly connecting the outlines to each other according the hierarchy, such that for each component, the graphical component structure for each component includes the full text of the textual component content for that component only, wherein the hierarchical component categorization includes at least one key component and at least one subcomponent related thereto; and c. at least one output device connected to the at least one computing device for outputting the automatically generated diagrammatic representation of a technology showing the visually integrated and linked diagram and text-based components in the corresponding hierarchical relationship.

16. A method for mapping technology comprising the steps of:

a. providing a system for receiving information inputs relating to an invention, wherein the system includes a computer having a processor, a memory, graphic user interface, and input mechanisms and providing information inputs to the system relating to components of a technology;

b. transforming the information inputs by automatically generating a multiplicity of hierarchical relational including at least one key component and at least one subcomponent associated with the at least one key component, wherein the multiplicity of hierarchical diagrams are diagrammatic of a technology, wherein the diagrammatic a hierarchical component categorization of the technical components of the technology based upon the user inputted information, wherein the hierarchical diagrammatic comprises graphical component structure and textual component content associated with each component such that for each component, the graphical component structure for each component includes the full text of the textual component content directly related only to that specific component, and outputting a viewable diagram of that categorization, and wherein each of the components and its corresponding text-based information and its corresponding diagram components are automatically directly linked by being visually integrated with one another within the graphical component structure; wherein the hierarchical component categorization includes at least one key component and at least one subcomponent related thereto, and c. the at least one user viewing the diagram multiplicity of hierarchical diagrams and text-based information in a tangible medium.

* * * * *